US006971619B2

(12) United States Patent
Pearson

(10) Patent No.: US 6,971,619 B2
(45) Date of Patent: Dec. 6, 2005

(54) AIRGLIDE COMPUTER MOUSE PAD HAVING WHISPER SURFACES

(76) Inventor: Leonard B. Pearson, 11 Glenbourne Dr., Boonton Township, NJ (US) 07005

( * ) Notice: Subject to any disclaimer, the term of this patent is extended or adjusted under 35 U.S.C. 154(b) by 0 days.

(21) Appl. No.: 10/838,686

(22) Filed: May 4, 2004

(65) Prior Publication Data

US 2004/0206874 A1    Oct. 21, 2004

Related U.S. Application Data

(63) Continuation-in-part of application No. 10/287,048, filed on Nov. 5, 2002, which is a continuation-in-part of application No. 09/838,506, filed on Apr. 19, 2001, now abandoned.

(60) Provisional application No. 60/210,787, filed on Jun. 12, 2000.

(51) Int. Cl.$^7$ .............................. B32B 3/10; B32B 7/00
(52) U.S. Cl. ............................. 248/346.01; 270/39.05
(58) Field of Search .................. 248/346.01; 270/39.05

(56) References Cited

U.S. PATENT DOCUMENTS

| | | | | |
|---|---|---|---|---|
| 3,673,135 A | * | 6/1972 | Blake et al. ................. 527/314 |
| 3,925,584 A | * | 12/1975 | Suzuki et al. ............... 428/40.5 |
| 4,678,206 A | * | 7/1987 | Leahan .......................... 281/44 |
| 4,834,502 A | | 5/1989 | Bristol et al. ................ 350/322 |
| 4,907,824 A | | 3/1990 | Smirnoff ....................... 281/45 |
| 4,975,735 A | * | 12/1990 | Bright et al. .................. 355/75 |
| 5,032,424 A | * | 7/1991 | Carlson et al. .............. 427/542 |
| 5,194,299 A | * | 3/1993 | Fry ........................... 427/208.6 |
| 5,358,766 A | | 10/1994 | Field ............................. 428/77 |
| 5,405,168 A | | 4/1995 | Holt ............................... 281/2 |
| 5,542,637 A | | 8/1996 | Schriner ................. 248/346.01 |
| 5,727,725 A | * | 3/1998 | Paskvich ..................... 226/200 |
| 5,738,325 A | | 4/1998 | Brown .................. 248/346.01 |

(Continued)

FOREIGN PATENT DOCUMENTS

| | | | |
|---|---|---|---|
| GB | 2289520 A | * | 11/1995 |
| GB | 2307445 A | * | 5/1997 |
| JP | 10230778 A | * | 9/1998 |
| JP | 2000099265 A | * | 4/2000 |

*Primary Examiner*—Jonathon Szumny
(74) *Attorney, Agent, or Firm*—Ernest D. Buff & Associates, LLC; Ernest D. Buff; Theodore J. Pierson

(57) ABSTRACT

A computer mouse pad comprises a rigid base and a plurality of fanfolded paper sheets arranged in a stack and detachably fixed to the base. Each of the stacked sheet is detachably fixed to a sheet immediately below it in the stack through microperfs. A subtle opening and closing of two levels of paper at the fold where two perfs occur, induced by mouse pressure, endows the working ply surface with a flexibility of vertical movement, creating a subtle mouse buoyancy. The sheets are provided with printed messages on upper surfaces thereof. A coating is applied to the upper surfaces of the sheets. The coated upper surfaces are resistant to being written upon, thereby preventing accumulation of carbon, graphite and ink markings, which tend to contaminate the roller ball, prevent proper mouse tracking and adversely affect curser control. When worn, the uppermost sheet is removed by tearing along the microperfs, thereby exposing the next sheet in the stack and its message, for use as the upper surface of the mouse pad. Timely refreshment of the upper surface may be encouraged by provision of a mouse pad in which the information conveyed by successive sheet removal creates a serial effect.

17 Claims, 8 Drawing Sheets

U.S. PATENT DOCUMENTS

| | | | |
|---|---|---|---|
| 5,788,203 A | 8/1998 | Nitti | 248/346.01 |
| 5,876,010 A | 3/1999 | Murphy | 248/346.01 |
| 5,919,562 A | 7/1999 | Root | 428/343 |
| 5,952,070 A | 9/1999 | Depiero | 428/40.1 |
| 5,971,340 A | 10/1999 | Murphy | 248/346.01 |
| 6,070,845 A | 6/2000 | Herskovitz | 248/346.01 |

* cited by examiner

Fig. 2
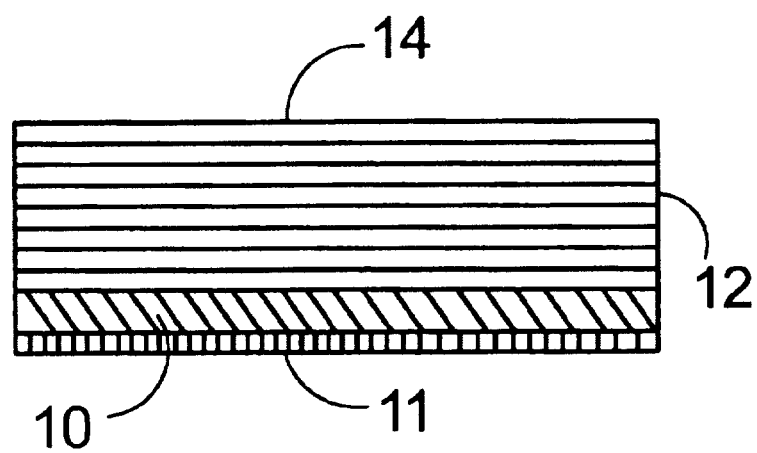

AIRGLIDE COMPUTER MOUSE PAD HAVING WHISPER SURFACES

CROSS REFERENCE TO RELATED APPLICATIONS

This application is a continuation-in-part of U.S. application Ser. No. 10/287,048 filed Nov. 5, 2002 which, in turn, is a continuation-in-part of U.S. application Ser. No. 09/838,506 filed Apr. 19, 2001 now abandoned which, in turn, claims the benefit of provisional patent application Ser. No. 60/210,787, filed Jun. 12, 2000.

BACKGROUND OF THE INVENTION

1. Field of the Invention

The present invention relates to the field of computer mouse pads; and more particularly, to a multi-function, computer mouse pad having detachable surfaces in multiple sheet form.

2. Description of the Prior Art

The computer mouse pad has become a standard peripheral for the personal computer. It typically functions in combination with the computer mouse to facilitate and improve the accuracy and efficiency of mouse manipulation. Mouse pads also prevent desks and tabletops on which the computer resides from being scratched by the mouse.

One of the problems with conventional mouse pads is the tendency thereof to collect scratches, stains, dirt and other disfigurements during use. Such blemishes and disfigurements not only mar the appearance of the mouse pad, but interfere with its tracking ability. Lint and other objects picked up by the rollers of the mechanical mouse accumulate on rollers housed inside the mouse. Inasmuch as these rollers support the track ball, the accumulation of lint thereon adversely affects roller-track ball contact. Tracking motion, and cursor control, as well as free motion of the mouse are impaired. The mouse's tracking ball fails to freely track across the mouse pad surface; and cursor control, required for accurate location of the mouse pointer on the computer screen, is lost or diminished.

A significant reduction or increase in surface friction or texture of the mouse pad surface occurs sooner or later, depending mainly on the pad's surface construction and the usage to which it is subjected. Any bunching or horizontal shifting in plane of the mouse pad surface results in enhanced friction and poor rolling of the track ball. Decreased friction occasioned by contamination of the surface causes the track ball to slip rather than roll. Variations in the quality of the surface of the mouse pad change the friction characteristics of the track ball. Tracking ball movement is restricted, and tends to worsen over time, until the mouse becomes virtually useless in contact with the pad surface. Few problems are more maddening to the computer operator than the loss of cursor control imposed by imperfect roller ball tracking. Moreover, the stress imposed on the wrist and hand during continued mouse manipulation can lead to discomfort and pain over time. The importance of resolving these problems is demonstrated by the lack in the art of a mouse pad having detachable fanfolded surfaces which prevent writing thereupon and can be refreshed, and also offer the comfort and ease of an airglide effect using whisper-type surfaces.

Fanfolded note pads are known in the art. U.S. Pat. No. 4,768,810 to Mertens discloses a fanfolded tablet of a web comprising, among other components, a plurality of stacked sheets. Since the sheets in Mertens are free from any coating which could inhibit the acceptance of inked messages, each of the sheets can be written on and then returned to tablet form after being written upon or separated to expose a fresh writing surface.

Fanfolded sheets capable of being fed through a printer are known in the art. U.S. Pat. No. 4,814,216 to Brunett et al. discloses a transparency medium for automatic printers. It comprises, among other components, a plurality of sheets of paper especially adapted for automatic printers. U.S. Pat. No. 5,776,591 to Mertens discloses an elongate printable sheet composite. It comprises among other components, a sheet composite to be fed from the stack longitudinally through a printer while the printer is actuated to form a desired message along a portion of the sheet composite.

Pads having alternating sides of adhesion are known in the art. U.S. Pat. No. 5,755,355 to Timmerman et al. discloses a pad including coadhesively adhered sheets. It comprises, among other components, a plurality of sheets of paper conducive to being written upon. U.S. Pat. No. 6,013,149 to Timmerman et al. discloses a pad including coadhesively adhered sheets. It comprises among other components, a plurality of non-folded flexible sheets of paper to form a pad in the shape of a cube. The sheets of paper are passed through a printing press that prints various printing indicia on either or both of the surfaces of the sheets of paper. Such printing can be done either before or after the sheets are coated with adhesive. Timmerman et al. discloses a method for forming such scratch pads or writing pads that may include well over 100 sheets of paper. U.S. Pat. No. 6,040,026 to Iwabuchi et al. discloses a pressure-sensitive adhesive sheet and laminate of pressure-sensitive adhesive sheets. It comprises a release layer that does not cover the entire surface of the sheets in the pad. By partially installing the release layer, stamping and writing are made possible on the portion of the sheets free from the release layer. U.S. Pat. No. 6,153,278 to Timmerman et al. discloses a pad of adhesively secured sheets comprising, among other components, an adhesive layer that will join the sheets of paper in the note pad. Timmerman et al. teaches that it is desirable that the adhesive be selected so that it may be printed or written upon by inks with equal facility as the uncoated areas of the paper sheets in the note pad. The note pad in Timmerman et al. may include a large number of paper sheets so that it forms the shape of a cube which is useful for advertising purposes.

With each of these devices hereinabove, the writing and/or printing on the sheets of the pad tends to contaminate the mouse roller ball thereby inhibiting proper mouse tracking.

There remains a need in the art for a computer mouse pad which can be used with a variety of mouse tracking devices, to accomplish optical or roller ball tracking, and cursor location and mouse manipulation in an accurate, reliable manner over a prolonged period of time while offering the comfort and ease of an airglide effect using whisper-type surfaces.

SUMMARY OF THE INVENTION

The present invention provides a computer mouse pad having an uppermost surface adapted to provide optimal roller ball and/or optical mouse tracking. A plurality of fanfolded detachable mouse pad plies mounted on a base provide means for refreshing the mouse pad surface to maintain optimal tracking conditions. A single sheet of paper having appropriate dimensions is perforated using microperfing at appropriate intervals. As used herein, the terms "microperfs" and "perfs", respectively, are each defined as microperforations. The size of the single sheet of paper is determined according to the size and number of fanfolded sheets desired. The sheet is then folded on the perfs to form individual plies having a fanfolded arrangement. The individual sheets of paper are detachably attached to the adjoining sheet by microperfs along fanfolded edges. Optionally, adhesive places are applied substantially near four corners of the paper sheets to further prevent horizontal displacement of the sheet during movement of the mouse thereover. The mouse pad plies are removed successively before usage causes the uppermost surface to become so worn or degraded that tracking or surface appearance is adversely affected.

Each of the detachable plies is constructed of paper having an offset weight of approximately 70 pounds. In addition to its weight, the paper has adequate tensile strength to withstand deformation forces imposed by movement of the mouse, even when it is not supported by adhesive places in between each layer, including the layer located immediately above a rigid base. The base of the ply comprises a paper composition similar to that conventionally used for most note-taking paper pads. For increased stability, the base may additionally be provided with a non-skid under surface. Generally, the number of tracking surfaces exceeds several plies and ranges upward into the mid-teens. The maximum number of plies utilized depends on the strength and thickness of the sheets of paper, the thickness of the optional adhesive and the support structure provided by the combination of the paper sheets and the optional adhesive layer. The surface of each sheet that opposes the optional adhesive coated surface is provided with an adhesive release coating, which additionally functions to enhance the appearance of the surface. The adhesive release coating operates to decrease damage to the sheet brought about by swelling or buckling, which is oftentimes created by moisture absorption and other environmental conditions. The coating further operates to minimize the accumulation of dust, stains, carbon or graphite material, and the like. It enhances the overall ability of the upper surface to maintain proper tension, thereby facilitating mouse tracking movement.

Each of the plies is, optionally, provided with printed material on its uppermost surface. Through an on-press or off-press application, each ply is further provided with a protective spray coating to enhance surface quality. This spray coated surface layer is transparent so that the printed material could be easily seen and also functions as a release layer and a moisture barrier.

The individual sheets of paper are detachably attached to the adjoining sheet by microperfs along fanfolded edges Further adhesion of the plies can optionally be achieved by applying adhesive places substantially near four corners of the undersurface of each ply, to provide sufficient tackiness that the plies are stabilized against movement in virtually any direction without compromising removability.

In one embodiment, the optional adhesive coating may be applied as a closely spaced series of circles or rectangles, so that the top layer is prevented from horizontal motion when the mouse is tracking. This spacing sensitively depends on (1) the tensile strength of the sheet of paper, which is controlled by the fiber length of the paper; (2) the bulk density of the paper (herein defined as the distance between the fibers and the resultant hydrogen bond); and (3) the thickness of the adhesive layer. Since the adhesive layer deforms freely under load, it is preferable to minimize the thickness of the adhesive layer as compared to the thickness of the paper. It is also desirable to use paper having higher tensile strength, so that they can withstand the forces applied by the mouse. One or more adhesive places can be applied to the under surface of each ply to improve adhesion of the upper ply to the ply below it, and thereby stabilize the plies against transverse movement during use.

More specifically, the invention provides a computer mouse pad comprising a rigid base and a stack of fanfolded sheets of paper detachably fixed to the base. Each sheet of the stack is detachably fixed to the sheet below it. The stacked sheets are provided with printed messages on upper surfaces thereof. An upper sheet is removed when worn or soiled by tearing it along the perforations, thereby exposing the next sheet in the stack and its message, for use as the upper surface of the mouse pad. The coated upper surface is resistant to being written upon thereby preventing accumulation of carbon, graphite, ink, and the like, which tend to contaminate the mouse, especially those using a roller ball, and prevent proper mouse tracking and adversely affect cursor control. This coating also acts as a moisture barrier, preventing the swelling of the top most paper sheet; and as a release layer to allow the sheet to be detached readily from the adjoining sheet.

The plies are held in a stationary position during mouse tracking by an accordion-style microperf binding applied on two sides thereof. Stabilization of the plies during mouse tracking may also be achieved by providing them with adhesive therebetween without preventing them from being successively pealed away to rejuvenate the mouse-tracking surface. One or more adhesive areas applied to the undersurface of each ply represent an alternative means for improving adhesion between the plies to stabilize the mouse-tracking surface. The bottom ply undersurface is coated with a non-skid compound or affixed to a cardboard-like ply which is coated underneath with a non-skid compound or having a non-skid material such as foam rubber. Alternatively, the next to bottom ply can have the non-skid compound with the bottom ply serving advertising or informational purposes, detachable when the mousepad is first placed in use.

During tracking the mouse travels on one or more levels of air that reside between the plies. As mouse tracking pressure is applied, air can escape through the open spaces between successive plies and also to some extent through the tiny holes at the successive fold perfs. A subtle opening and closing of two levels of paper at the fold where two perfs occur, induced by mouse pressure, endows the working ply surface with a flexibility of vertical movement, creating a subtle mouse buoyancy. Mouse movement is facilitated, leading to ease of movement; tactile feel is enhanced. The result is a more easily steerable mouse and a lower coefficient of drag. Mouse movement is more efficient and the mouse is more comfortable to handle.

Yet another advantage of the present invention is its low production cost. Construction is fanfolded; and the need for bursting or cutting operations (required to produce separate pages) is eliminated. The present invention is lighter and less expensive to produce. It affords more efficient mouse movement and more comfortable mouse handlability. The present invention also provides a surface which minimizes stress on the wrist and hand by enabling a flexibility of vertical movement.

Advantageously, the pile with detachable plies provides means for regenerating fresh usable surfaces, one surface at a time, as surfaces become degraded in appearance or mouse tracking capability. The pile also provides means for displaying printed information helpful to the computer user, such as application shortcuts, tips, and the like. Printed information additionally displayed by the pile can comprise decorative configurations, such as color pictures of flower bouquets, landscapes or patterns, calendar images and other presentations, including advertising. Detached plies can be displayed apart from the pad, scanned into memory or otherwise saved, or discarded, in accordance with user preferences. The mouse pad appearance can be refreshed by providing a newly exposed ply having the same presentation as the previous ply. Refreshing the ply appearance can be encouraged by displaying on successive pages a plurality of differing, self-contained printed images that provide continuity. An incentive for timely refreshment of the ply appearance can also be engendered by provision of a mouse pad in which the information conveyed by successive ply removal creates a serial affect.

BRIEF DESCRIPTION OF DRAWINGS

The invention will be more fully understood and further advantages will become apparent when reference is had to the following detailed description and the accompanying drawings, in which:

FIG. 2 is a side view of the mouse pad shown by FIG. 1;

DESCRIPTION OF THE PREFERRED EMBODIMENTS

Figure 1:
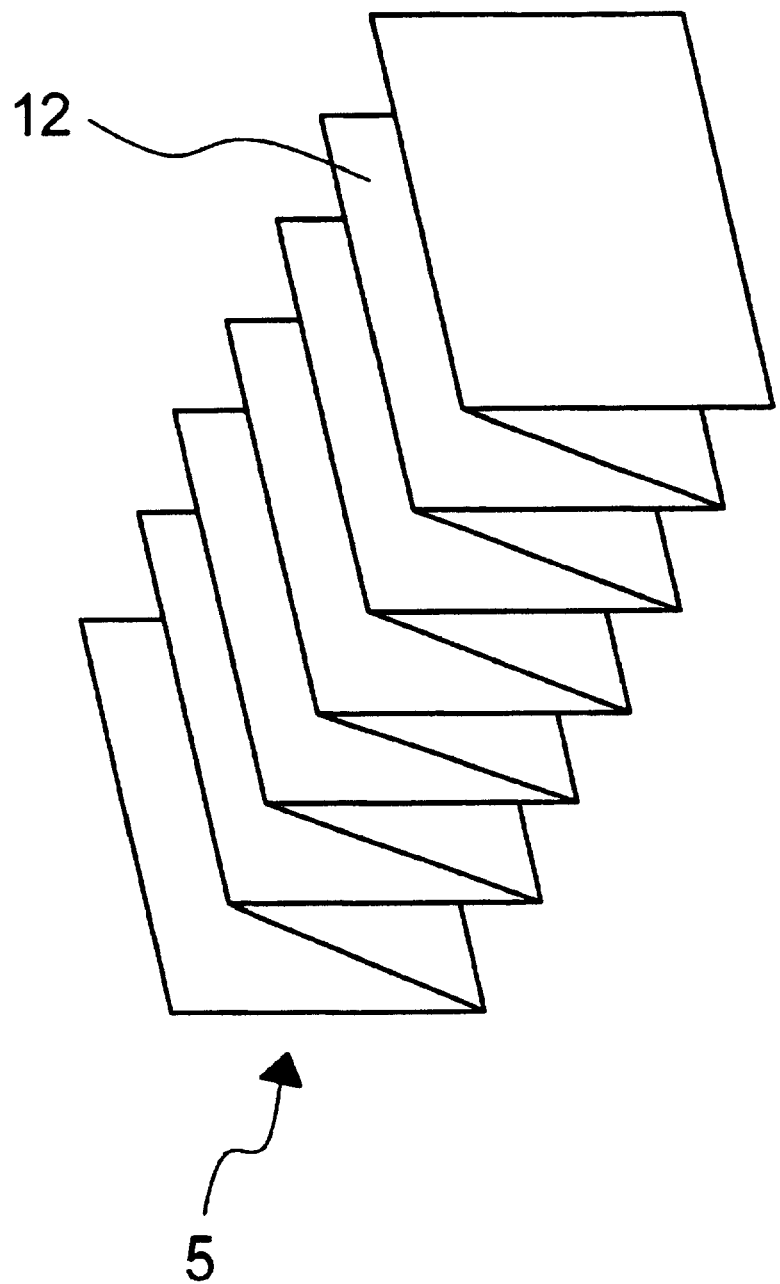
FIG. 1 is a top diagonal view depicting the mouse pad shown in FIG. 1, displaying the fanfold arrangement of the sheets with an exaggerated view of the mouse pad's vertical buoyancy.

The mouse pad of the present invention comprises a plurality of fanfolded plies adapted to provide continually available surfaces. A single sheet of paper having appropriate dimensions is perforated using microperfing at appropriate intervals. The size of the single sheet of paper is determined according to the size and number of fanfolded sheets desired. As used herein, the terms "microperfs" and "perfs", respectively, are each defined as microperforations. The sheet is then folded on the perfs to form individual plies having a fanfolded arrangement. Advantageously, the uppermost surface of the mouse pad is refreshed periodically by successive removal of plies before the uppermost surface becomes unduly worn in texture or appearance. Trouble-free tracking of the mouse, and optimal curser control is obtained through utilization of detachable mouse pad plies mounted on a base.

Each detachable ply is preferably composed of paper having approximately 70 pound offset weight, with good tensile strength properties. The base is generally a composition paper similar to that used with most note-taking paper pads, and is preferably provided with a non-skid under surface. A plurality of plies, typically exceeding several and ranging upward to the mid-teens, provide means for refreshing the tracking surface periodically. The maximum number of plies employed during usage of the mouse pad can vary, depending on the ability of the upper surface to resist degradation caused by plowing. Such "plowing action" is produced during rolling of the track ball of a mouse. It is influenced by the strength and thickness of the of the sheet of paper, the thickness and distribution of the optional underlying adhesive layer, scratches, stains, pencil and pen markings, and the like. In this manner there is maintained a tension and surface friction sufficient to facilitate tracking ball movement of a mouse.

Each of the piles is printed on its uppermost surface, and through an on-press or off-press application receives, if desired by the pad designer and/or manufacturer, a protective spray coating to enhance surface quality. In addition to the fanfolded microperf binding, adhesion of the plies can optionally be achieved by providing sufficient tackiness on the ply undersurface. The adhesive places preferably are found substantially near four corners of the underside of the paper sheet. It can also be provided in the form of patterned coverage applied to preselected areas, to thereby achieve adhesion without compromising removability. Adhesion of each upper ply to the ply immediately below it is improved by application of either four corner coverage of the underside of the paper sheet or patterned coverage comprising one or more adhesive places applied to preselected areas of the upper ply's bottom side. The number of adhesive places should be sufficient to provide coverage adequate to prevent horizontal motion of the top sheet of paper under forces applied by the mouse track ball.

Advantageously, the pile with detachable plies comprises a means for generating fresh usable surfaces, one surface at a time, as extant surfaces lose their efficacy. The pile also comprises a means for displaying printed information useful to the computer user. Such printed information can include application shortcuts, tips, and the like. It can also include decorative pages such as color pictures of flower bouquets, landscapes or patterns, calendar pages and other presentations, such as advertising. Detached plies can be displayed apart from the pad, scanned or otherwise saved into memory, or discarded, according to user preferences. Means are thereby provided for attaining a fresh mouse pad appearance. Successive pages displaying a plurality of differing, self-contained printed images that collectively provide presentation continuity can be used to encourage timely refreshment of the plies. The incentive for timely ply refreshment can also be engendered by provision of a mouse pad in which the information conveyed by successive ply removal creates a serial affect.

The plies are held in a stationary position during mouse tracking by an accordion-style microperf binding applied on two sides thereof. Stabilization of the plies during mouse tracking is also achieved by optionally providing them with adhesive therebetween without preventing them from being successively pealed away to rejuvenate the mouse-tracking surface. One or more adhesive areas applied to the undersurface of each ply represent an alternative means for improving adhesion between the plies to stabilize the mouse-tracking surface. The bottom ply undersurface is coated with a non-skid compound or affixed to a cardboard-like ply which is coated underneath with a non-skid compound or having a non-skid material such as foam rubber. Alternatively, the next to bottom ply can have the non-skid compound with the bottom ply serving advertising or informational purposes, detachable when the mousepad is first placed in use.

The use of micro perforation acts to distinctly define plies on a traveling web of paper or sheet of paper. Moreover, in the process it secures one ply with an adjoining ply with the means for facilitating separation of the plies in a clean, easy-to-use detachment tear line. Further, the release of the plies at the detachment results in both of the formerly attached edges being remarkably smooth and devoid of the stubble found with usual perforations. Hence the appearance of successive plies is improved.

Additionally, the use of the small cuts of the microperfs that are made in the paper can, to an extent based on the paper stock, length of the cut, depth of cut, length of tie (the connection of paper stock between the cuts), etc., pass air along the edge of adjoining plies, thus creating a flexible medium for helping to enhance desirable buoyancy to the mousepad plies.

During tracking the mouse travels on one or more levels of air that reside between the plies. As mouse tracking pressure is applied, air can escape through the open spaces between successive plies and also to some extent through the tiny holes at the successive fold perfs. A subtle opening and closing of two levels of paper at the fold where two perfs occur, induced by mouse pressure, endows the working ply surface with a flexibility of vertical movement, creating a subtle mouse buoyancy. Mouse movement is facilitated, leading to ease of movement; tactile feel is enhanced. The result is a more easily steerable mouse and a lower coefficient of drag. Mouse movement is more efficient and the mouse is more comfortable to handle.

Yet another advantage of the Mousepad is its low production cost. Construction is fanfolded; and the need for bursting or cutting operations (required to produce separate pages) is eliminated. The Mousepad is lighter and less expensive to produce. It affords more efficient mouse movement and more comfortable mouse handlability. The present invention also provides a surface which minimizes stress on the wrist and hand by enabling a flexibility of vertical movement.

Referring to FIG. 1 of the drawings, there is shown generally at 5 the computer mouse pad of the invention having detachable fanfolded sheets 12. The figure depicts the fanfold configuration of the sheets. The buoyancy that is created by the mouse pad from the airglide effect has been exaggerated to display the flexibility of vertical movement.

In FIG. 2 there is shown a side view of a mouse pad 5, wherein stack 12 is detachably fixed to base 10. The stack is shown having the fanfolded sheets compressed together for shipping. The lower side of base 10 is preferably provided with a non-skid surface 11. A mouse (not shown) is maneuvered on the upper surface of sheet 14. Preferably, base 10 is rigid enough for pad 5 to be held by a corner without substantial bending or deformation thereof; and it is comprised of cardboard at least 0.5 mm thick. Alternatively, the base 10 is comprised of plastic at least 0.25 mm thick. Each sheet in the stack 12 is detachably fixed to the sheet below it in the stack along the fanfold edge 33 containing microperfs (shown in FIG. 4). It optionally may contain an adhesive distribution sufficient to prevent horizontal movement of the paper sheet under the applied loading of the mouse track ball. A printed message 15 (shown in FIG. 1) is disposed on the upper surfaces of the sheets. Preferably, printed message 15 is visible from the top of sheet 14. When upper sheet 14 becomes worn or soiled, it is removed by pulling up edge 16, as indicated in FIG. 1. Removal of sheet 14 exposes the next sheet 18 in stack 12, as well as the printed message thereon; and sheet 18 then functions as the new upper surface of mouse pad 5. Pulled-up edge 16 reveals next sheet 18, as well as adhesive 17 that detachably fixes top sheet 14 to next sheet 18.

Typical adhesive employed for optionally coating the underside of the sheets in the computer mouse pad include rubbery materials, which form a pressure sensitive adhesive layer wherein block copolymers together with plasticizers are used. The block polymers such as high-cis polyisoprene compositions in the unvulcanized green state are applied and cross linked to form a tacky coating. High strength adhesives, films and coatings wherein 5–30 weight percent of block copolmer of the type A-B-A to 100 parts by weight of conventionally tacky viscoelastic pressure sensitive adhesive can be used to produce a higher strength adhesive. The high strength properties are obtained by blending minor amounts of certain block copolymers, which can be elastomeric, with the adhesive solids. In the resulting reinforced pressure-sensitive adhesive solids, the major elastomeric component comprises one of the homopolymers or random sequence polymers commonly used in tackified or inherently tacky pressure-sensitive adhesives, e.g. natural rubber, synthetic polyisoprene, styrene-butadiene rubber (SBR), rubbery polyolefins, and the inherently rubbery and tacky acrylate and vinyl ether polymers. The aforementioned block copolymer, though a minor component compared to the rubbery homopolymer or random sequence polymer, has a significant reinforcing effect. The increase in film integrity or physical strength of the adhesive obtained is evidenced by increased tensile strength and is similar to that obtained by the use of fibrous reinforcement, while at the same time avoiding the above-noted disadvantages caused by fiber addition. These block copolymers blend with the pressure-sensitive adhesive (hereinafter referred to as the "PSA") providing homogeneous reinforcement. The use of a high strength adhesive layer allows use of thin adhesive layers in the thickness range of 10 to 50 micrometers with excellent adhesive and support properties without crinkling or deformation of the sheets in the mouse pad when the mouse track ball is rolled.

Figure 3:
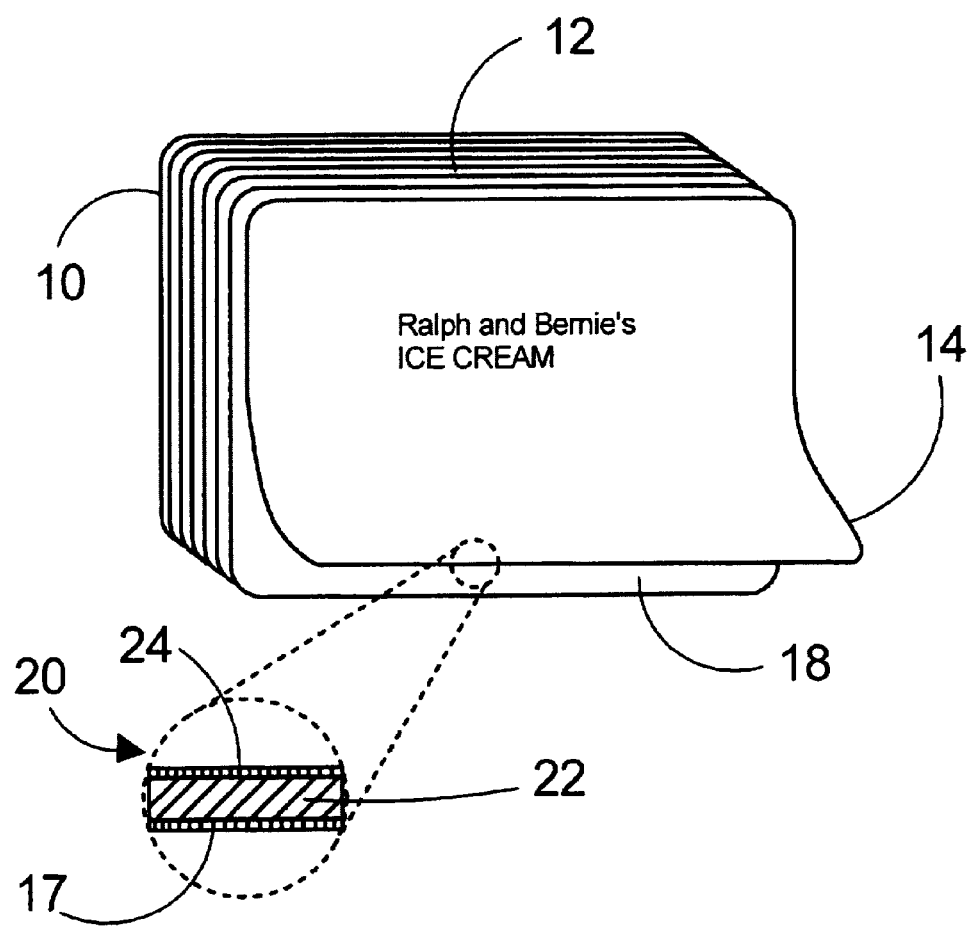
FIG. 3 is a blow-up of one edge of a sheet of the mouse pad shown in FIG. 1.

Referring to FIG. 3 of the drawings, there is shown generally at 20 a magnified view of the edge of top sheet 14 in stack 12. The stack is shown having the fanfolded sheets compressed together for shipping. Each of the stacked sheets is comprised of paper 22 having an upper surface laminated or coated with a thin smooth film 24, such as PVC or cellophane. This coating resists moisture penetration into the paper, which can degrade paper strength and cause it to swell, compromising the hydrogen bond. In addition, the coating functions as a release layer to facilitate separation of the adhesive layer. All sheets within stack 12 are similarly constructed. Film 24 is resistant to being written upon or soiled. This coating extends strictly to areas of the sheet where the mouse would normally be expected to move, leaving the remaining portions of the pad available for note taking and message writing. The smoothness of film 24 significantly reduces friction between the mouse pad surface. Most writing instruments such as pencils or pens of the fountain or roller ball variety do not function properly on the film 24. As a result, use of the mouse tracking surface for note taking is discouraged. In addition, film 24 functions as a release agent for the optional adhesive layer. A friction reduction adequate for this purpose is accomplished without affecting the friction between the mouse pad surface and the rubber mouse roller ball. As such, the upper surface provides for an enhanced contact with the mouse roller ball that engages it. Unrestricted roller ball tracking and improved cursor control is afforded. The resistance to pencil and pen marks significantly reduces the amount of contaminants such as carbon, graphite, ink or the like on the upper surface of the mouse pad. In addition, the smooth coated surface affords increased resistance to soil and stains. Such contaminants, when present, tend to interfere with movement of the mouse roller ball, disrupting mouse tracking, with the result that cursor control is severely diminished. Preferably, film 24 is formed from a composition conventionally referred to by the printing industry as an aqueous solution. The aqueous solution is applied on-press to brighten the paper sheets of which the pile is comprised. It significantly improves the soil and wear resistance of the upper surface of sheet 14. Film 24 is also resistant to writing. Typically, the coating solution is drawn from a fountain onto a metal roller and then transferred to a rubber blanket. It is then brought into contact with the paper sheet or web traveling through the press. The coating dries by the time it reaches the stacker end of the press, forming film 24.

The top surfaces of the sheets in the mouse pad are coated with a release layer, which allows easy separation of the adjacent sheet coated with the adhesive. The coating is generally transparent allowing the printed material on the sheets to be seen clearly. A release coating of fluorochemical variety can be made from essentially of a polymer of moieties consisting essentially of (a) perfluoroalkylsulfonamido lower alkyl acrylate in which the alkyl portion of the perfluoroalkylsulfonamido moiety contains 3–20, preferably 3–12, carbon atoms, (b) a perfluoroalkylsulfonamidoalkanol: toluene diisocyanate:hydroxypropylmethacrylate reaction product in which the alkylidene radical contains 1–11 carbon atoms and (c) 0–10% by weight, based on total polymer, of lower alkyl acrylate. The use silicones as release agents, including siloxane starting materials, accelerators, cross linking agents, curing catalysts, and coating techniques are well-known. For example a release agent can be formed by the reaction of an isocyanate-terminated moiety and a liquid hydroxyl- or amine-containing organosilicone. This release agent, however, is effective with only a few specific adhesives. For computer mouse pad application it is desirable to use fluorochemical or silicone release coatings, since both coatings are transparent, provide easy release of adhesive coatings employed and discourages writing since graphite from a pencil or ink from a pen are not deposited on the sheet of paper.

In an alternative embodiment, a varnish is used as film 24 to render the upper surface of sheet 14 resistant to stains, wear and marking with carbon, graphite and ink. As a further alternative, film 24 is comprised of PVC or cellophane. With this construction of the mouse pad, the upper surface of sheet 14 is rendered virtually immune to wet ink contamination. The surface energy provided by the PVC or cellophane film 24 causes the ink to bead, enhancing resistance against adherence thereof to the upper surface of sheet 14. As yet another alternative, film 24 comprises a heat-set ink which through the application of heat almost instantly dries and hardens, imparting wear and writing resistant properties to the upper surface of sheet 14.

As best shown in FIG. 3, the lower surface of paper 22 is optionally coated with adhesive 17. The coated adhesive 17 is tacky enough to hold stack 12 together; yet still be able to separately remove each sheet of paper. Such adhesives are well know by those skilled in the art.

Paper 22 must be of adequate weight and strength to withstand the stress of track ball use and removal from the pad. Very heavy paper, having offset weight greater than 95 pounds, will result in unnecessarily thick sheets without adding substantially to the robustness of a sheet. Preferably, the offset weight of the paper sheets is between 20 and 90 pounds. More preferably, the offset weight ranges from about 45 to 85 pounds. Most preferred is paper having offset weight substantially equal to about 70 pounds.

Figure 6:
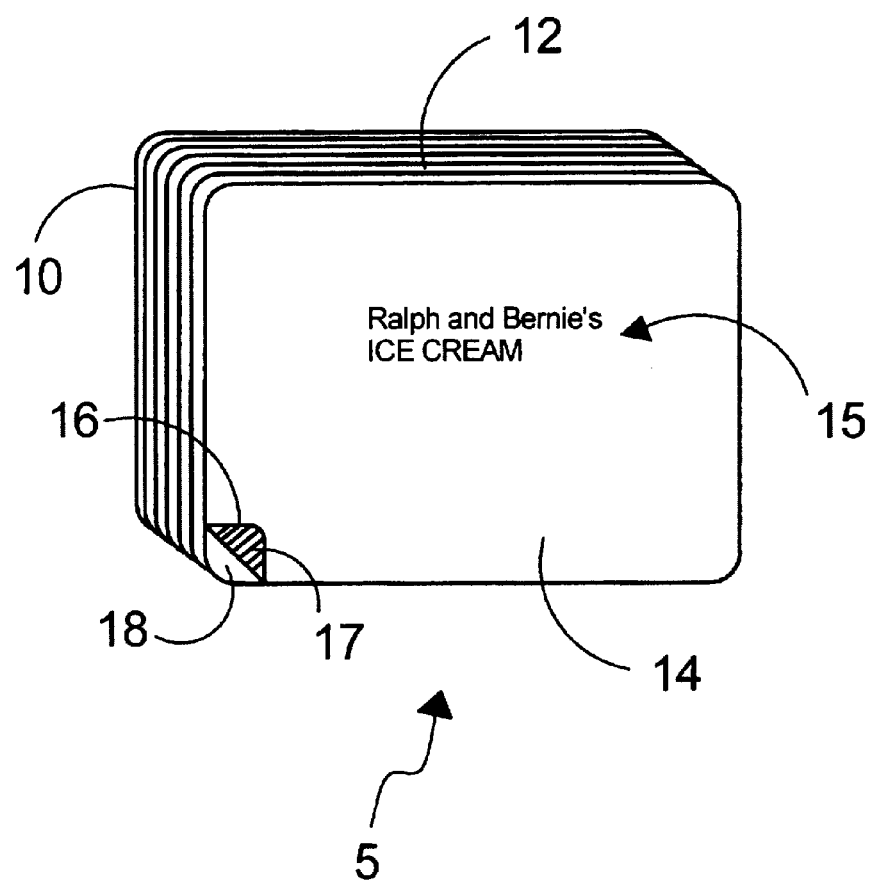
FIG. 6 is a perspective overhead view depicting the mouse pad of this invention.

The adhesive layer should be as thin as possible, applied substantially near four corners of the underside of the sheet (shown in FIG. 6). The thickness of the adhesive layer may range from 10 micrometers to 50 micrometers. Alternatively, the adhesive layer may be applied as a series of closely spaced circular dots or rectangular shapes that collectively cover from 50 to 95 percent of the sheet area. The distribution of the patterns and the unbonded distance between bonded regions depend on the strength and thickness or weight of the paper. Thicker and stronger papers permit larger unbonded distances with very little or no horizontal displacement of the sheet under the track ball loading.

Message 15 on the sheet is an advertisement, logo, computer usage hint, cartoon, or the like. All the sheets have the same or, alternatively, different messages. The messages are preferably printed on the upper surface of each paper sheet prior to application of the laminated or coated film to the paper surface. Alternatively, when film 24 comprises a transparent material, message 15 may be printed on the lower surface of the film 24.

Figure 4:
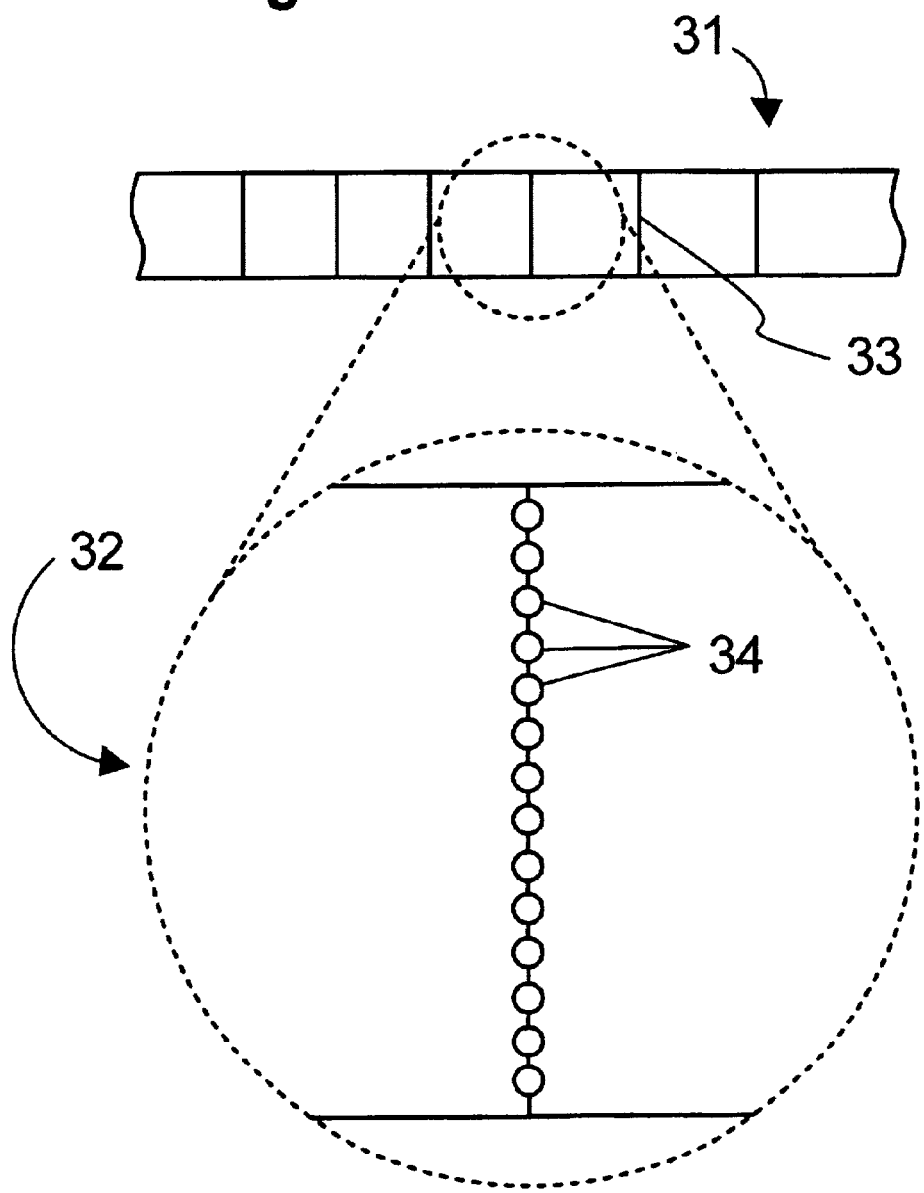
FIG. 4 is a perspective overhead view depicting a portion of the single sheet of paper used to construct the mouse pad shown in FIG. 1., and including a blow-up of the fanfolded edge showing the microperfs.

Referring to FIG. 4 of the drawings, a section of the single sheet of paper 31 used to construct the mouse pad is shown. There is shown generally at 32 a magnified view of the single sheet 31 before construction of the mouse pad. This view shows the edges 33 that are fanfolded along the microperfs 34. To prevent unnecessary repetition, only three of the microperfs are called out in this figure. The microperfs are not drawn to scale. The proper size of the microperfs as well as the common methods of creating microperfs are generally known to one skilled in the art. Because construction is fanfolded, the need for bursting or cutting operations (required to produce separate pages) is eliminated. The Mousepad is lighter and less expensive to produce.

Figure 5:
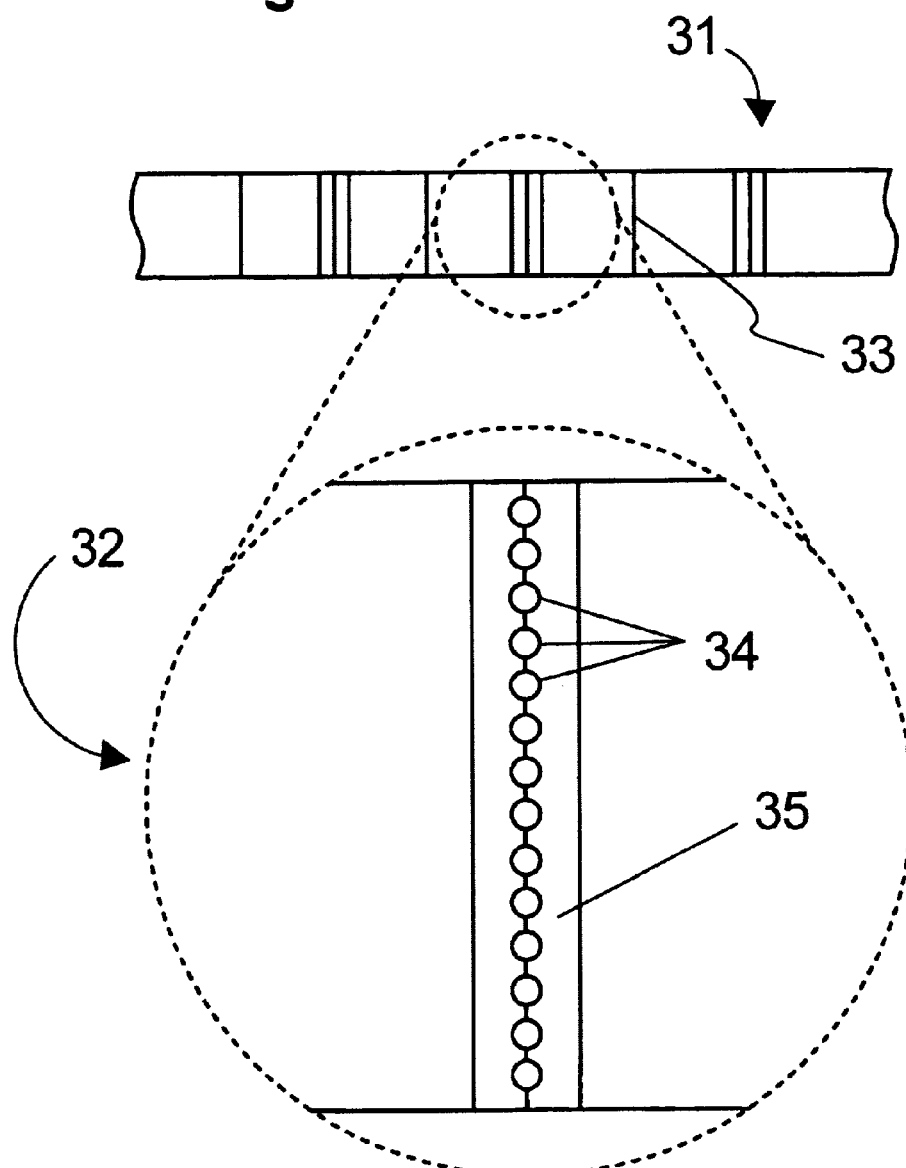
FIG. 5 is a perspective overhead view depicting a portion of the single sheet of paper used to construct the mouse pad shown in FIG. 1 having additional bands to allow the mouse pad to resist flattening, and including a blow-up of the fanfolded edge showing the band that resists flattening of the mouse pad.

Referring to FIG. 5 of the drawings, there is shown a single sheet of paper 31 used to construct the mouse pad. There is shown generally at 32 a magnified view of the single sheet 31 before construction of the mouse pad. This view shows the edges 33 that are fanfolded along the microperfs 34. To enhance the buoyancy of the mouse pad sheets and resist flattening, a band 35 of suitable material and size is attached along the folded edge 33 before the sheet has undergone microperfing 34. This band 35 will act to resist deformation of the paper along the fold 33, thereby enhancing the buoyancy of the mouse pad during mouse tracking which is achieved through the fanfolded design. To further increase buoyancy, the band 35 may be attached on both sides of the original sheet of paper 31 at the microperfing locations 33. The type of material and size of the band 35 is selected according to the size of the mouse pad and the amount of buoyancy desired, and will be readily ascertainable to one skilled in the art.

Alternatively, if the band 35 is placed at only one side of the original sheet of paper, then attachment of the band 35 should be alternated between the two sides of the original sheet of paper 31, to allow for the band 35 to always face in towards the middle of the mouse pad 5. This embodiment is shown at 32 in FIG. 5.

Referring to FIG. 6 of the drawings, there is shown generally at 5 the computer mouse pad of the invention. The mouse pad 5 is shown having the fanfolded sheets compressed together for shipping. The mouse pad 5 comprises a base 10 having detachably fixed thereto a stack of fanfolded paper sheets 12.

Figure 7:
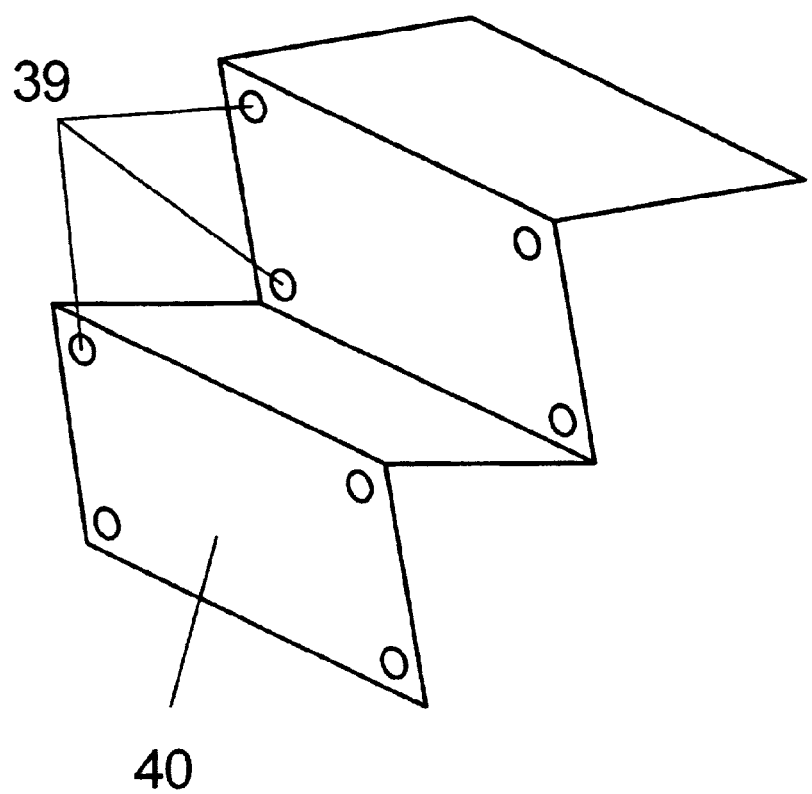
FIG. 7 is a top diagonal view depicting the mouse pad shown in FIG. 1, displaying the adhesive places of the sheets and the fanfold arrangement.

Referring to FIG. 7 of the drawings, there is further shown a closer view of the adhesive places 39. The bottom ply undersurface 40 is coated with a non-skid compound or affixed to a cardboard-like ply which is coated underneath with a non-skid compound or having a non-skid material such as foam rubber. Alternatively, the next to bottom ply can have the non-skid compound with the bottom ply serving advertising or informational purposes, detachable when the mousepad is first placed in use.

Figure 8:
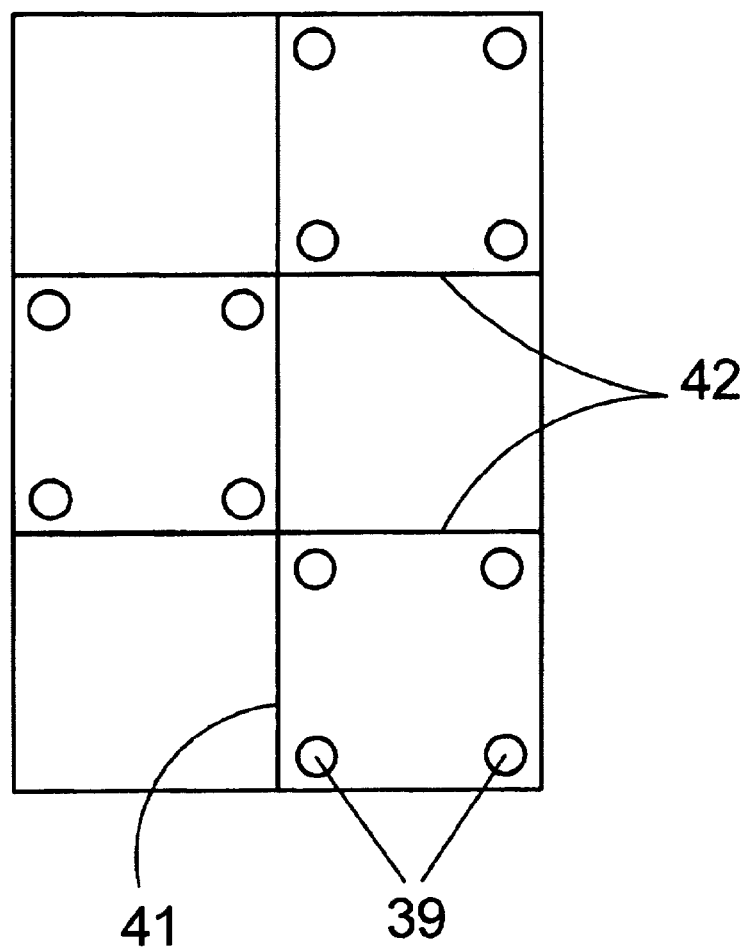
FIG. 8 is a perspective overhead view depicting a portion of the single sheet of paper used to construct the mouse pad having two perforated edges per sheet.

Referring to FIG. 8 of the drawings, an alternative embodiment of the present invention is shown. The embodiment includes perforated sheets having two rows side by side. The perforated sheets extend upward to achieve the desired number of plies (not shown). By including two rows of fanfolded sheets, the individual plies of the mousepad are provided with two perforated edges for each ply. The mousepad is constructed by first folding the sheets along the vertical edge 41. The sheets are then fanfolded along the horizontal edges 42. The adhesive places 39 are appropriately placed on alternating sheets to provide additional stability during mouse tracking.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A computer mouse pad having a top surface that facilitates tracking of a mouse, comprising;
   a. a rigid base;
   b. a fanfolded stack of paper sheets forming fold connections and detachably fixed to each other and to said base and comprising an uppermost sheet with an upper surface forming said top surface of said mouse pad;
   c. each sheet of paper in said stack being detachably fixed to a sheet immediately below it in said stack through microperforations along said fold connection, and having a printed message on its upper surface; and
   d. said upper surface being coated with a moisture resistant adhesive release layer, the coating being applied to areas of said upper surface appointed for contact by said mouse,
   e. wherein said fold connections further comprise an additional band to allow for said fanfolded stack of paper sheets to resist flattening and remain buoyant,
whereby said uppermost sheet is removed when worn thereby exposing the sheet immediately below it in said stack and its message for use as the upper surface of said mouse pad.

2. The computer mouse pad as recited by claim 1, wherein said base comprises a non-skid lower surface.

3. The computer mouse pad as recited by claim 1, wherein each of said sheets of paper has an offset weight ranging from about 20 to 90 pounds.

4. The computer mouse pad as recited by claim 1, wherein each of said sheets of paper has an offset weight substantially equal to about 70 pounds.

5. The computer mouse pad as recited by claim 1, wherein each of said sheets of paper has an offset weight of at least about 70 pounds.

6. The computer mouse pad as recited by claim 1, wherein said base is comprised of cardboard having a thickness of at least about 0.5 mm.

7. The computer mouse pad as recited by claim 1, wherein each sheet of paper in said stack is further detachably fixed to a sheet immediately below it in said stack through adhesive places.

8. The computer mouse pad as recited by claim 7, wherein said adhesive places are 10 to 50 micrometers in thickness.

9. The computer mouse pad as recited by claim 7, wherein said adhesive places are applied substantially near four corners of said sheets of paper.

10. The computer mouse pad as recited by claim 7, wherein said adhesive places are applied in the form of circular spots that collectively cover 50% to 95% of the underside of the said sheet of paper.

11. The computer mouse pad as recited by claim 1, wherein said base is comprised of plastic having a thickness of at least about 0.25 mm.

12. The computer mouse pad as recited by claim 1, wherein said uppermost surface resists formation thereon of markings composed of material selected from the group consisting of lead, graphite and ink.

13. The computer mouse pad as recited by claim 12, wherein said upper surface is coated with a film composed of PVC.

14. The computer mouse pad as recited by claim 12, wherein said upper surface is coated with a film composed of cellophane.

15. The computer mouse pad as recited by claim 12, wherein said upper surface is coated with a film composed of an aqueous solution.

16. The computer mouse pad as recited by claim 12, wherein said upper surface is coated with a film composed of varnish.

17. The computer mouse pad as recited by claim 12, wherein said upper surface is coated with a film composed of a heat-set ink.

* * * * *